(12) United States Patent
Salit et al.

(10) Patent No.: US 8,422,022 B2
(45) Date of Patent: Apr. 16, 2013

(54) INCREASING THE SCALE FACTOR OF GAS LASER BASED GYROSCOPES WITH AN EXTERNAL GAIN SATURATION BEAM

(75) Inventors: Kenneth Salit, Plymouth, MN (US); Mary Salit, Plymouth, MN (US); Jennifer S. Strabley, Maple Grove, MN (US); Terry D. Stark, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 363 days.

(21) Appl. No.: 12/851,178

(22) Filed: Aug. 5, 2010

(65) Prior Publication Data

US 2012/0033224 A1   Feb. 9, 2012

(51) Int. Cl.
*G01C 19/66* (2006.01)
(52) U.S. Cl.
USPC .......................................................... 356/469
(58) Field of Classification Search .................. 356/469, 356/459, 468, 470, 479–480; 372/6, 50.124, 372/94
See application file for complete search history.

(56) References Cited

U.S. PATENT DOCUMENTS

| | | | |
|---|---|---|---|
| 4,220,928 A | | 9/1980 | Bloom et al. |
| 4,481,635 A | * | 11/1984 | Broberg et al. ................ 372/94 |
| 4,494,873 A | * | 1/1985 | Perlmutter et al. ........... 356/467 |
| 4,632,555 A | | 12/1986 | Malvern |
| 4,762,415 A | * | 8/1988 | Geen et al. .................... 356/471 |
| 4,825,260 A | * | 4/1989 | Hendow et al. ................ 356/473 |
| 4,850,708 A | * | 7/1989 | Moore et al. ................... 356/459 |
| 4,884,283 A | * | 11/1989 | Rahn et al. ..................... 372/107 |
| 4,952,059 A | | 8/1990 | Desurvire et al. |
| 4,968,136 A | | 11/1990 | Lim et al. |
| 5,025,446 A | | 6/1991 | Kuizenga |
| 5,056,920 A | * | 10/1991 | Ahonen et al. ................ 356/469 |
| 5,080,487 A | * | 1/1992 | Martin ........................... 356/467 |
| 5,118,189 A | * | 6/1992 | Sanders et al. ................ 356/470 |
| 5,331,660 A | * | 7/1994 | Hauck ............................. 372/94 |
| 5,367,377 A | * | 11/1994 | Rahn ............................. 356/467 |
| 5,442,442 A | | 8/1995 | Kanegsberg et al. |
| 5,489,981 A | * | 2/1996 | Killpatrick et al. .......... 356/459 |
| 5,577,057 A | | 11/1996 | Frisken |

(Continued)

OTHER PUBLICATIONS

Shariar et al., "Ultrahigh Precision Absolute and Relative Rotation Sensing using Fast and Slow Light, Version 1", "Available at http://arxiv.org/pdf/quant-ph/0505192v1", May 2005, pp. 1-6, Publisher: arXiv.org.

(Continued)

*Primary Examiner* — Sang Nguyen
(74) *Attorney, Agent, or Firm* — Fogg & Powers LLC

(57) ABSTRACT

A ring laser gyroscope that includes a cavity containing a gain medium, a first plurality of reflective surfaces coupled to the cavity, a medium exciter operable to excite the gain medium, and a saturation beam source operable to emit a saturation beam. The first plurality of reflective surfaces includes a first reflective surface, a second reflective surface, and a third reflective surface. The first, second, and third reflective surfaces are positioned to reflect light along a path defined in the cavity between the plurality of reflective surfaces. The excited gain medium induces first and second laser fields within the cavity. The emitted saturation beam intersects with the first and second laser fields at a first interaction region of the cavity. The saturation beam interacts with the gain medium to reduce the gain of the first and second laser fields at a first range of frequencies.

20 Claims, 7 Drawing Sheets

U.S. PATENT DOCUMENTS

| | | | |
|---|---|---|---|
| 6,002,481 | A | 12/1999 | Bielas et al. |
| 6,208,414 | B1 | 3/2001 | Killpatrick et al. |
| 6,456,417 | B1 | 9/2002 | Maywar et al. |
| 6,704,111 | B2* | 3/2004 | Ecklund et al. ............... 356/459 |
| 6,914,929 | B1* | 7/2005 | Bergstrom et al. ............. 372/94 |
| 7,058,111 | B2 | 6/2006 | Seiber |
| 7,180,657 | B1 | 2/2007 | Shevy |
| 7,359,059 | B2 | 4/2008 | Lust et al. |
| 7,586,114 | B2* | 9/2009 | Cole et al. ...................... 250/575 |
| 7,663,756 | B2* | 2/2010 | Cole .............................. 356/437 |
| 7,804,600 | B1 | 9/2010 | Smith |
| 2006/0146335 | A1* | 7/2006 | Mitchell et al. ............... 356/459 |
| 2008/0278710 | A1 | 11/2008 | Schmidt et al. |
| 2010/0014091 | A1 | 1/2010 | Strabley |
| 2011/0249268 | A1 | 10/2011 | Salit et al. |

OTHER PUBLICATIONS

Shariar et al., "Ultrahigh Precision Absolute and Relative Rotation Sensing using Fast and Slow Light, Version 2", "Available at http://arxiv.org/pdf/quant-ph/0505192v2", Jul. 2005 , pp. 1-11, Publisher: arXiv.org.

Shariar et al., "Ultrahigh Precision Absolute and Relative Rotation Sensing using Fast and Slow Light, Version 3", "Available at http://arxiv.org/pdf/quant-ph/0505192v3", Oct. 2006 , pp. 1-24, Publisher: arXiv.org.

Shariar et al.,, "Ultrahigh Precision Absolute and Relative Rotation Sensing using Fast and Slow Light, Version 4", "Available at http://arxiv.org/pdf/quant-ph/0505192v4", Feb. 2007, pp. 1-28, Publisher: arXiv.org.

Shariar et al., "Ultrahigh Precision Absolute and Relative Rotation Sensing using Fast and Slow Light, Version 5", "Available at http://arxiv.org/pdf/quant-ph/0505192v5", Mar. 2007, pp. 1-28, Publisher: arXiv.org.

Du, "Understanding the Characteristics of Gain Saturation for Homogeneously Broadened Laser Medium From the Point of View of", "http://spie.org/etop/2007/etop07fundamentalsIV.pdf", 2007, pp. 1-4.

Pati et al., "Simultaneous Slow and Fast Light Effects Using Probe Gain and Pump Depletion Via Raman Gain in Atomic Vapor", 2008, pp. 1-6, Publisher: Optical Society of America.

Pati et al., "Simultaneous Generation of Slow and Fast Light for Raman Coupled Beams", "Advances in Slow and Fast Light", 2008, pp. 69040L-1 thru 69040L-7, vol. 6904, Publisher: SPIE.

Rabeendran, "A Study of Ring Laser Gyroscopes", 2008, pp. i-88, Publisher: University of Canterbury.

Salit, "Intracavity Fast Light for Rotation Sensing and Gravitational Wave Detection", Jun. 2009, pp. 1-221, Publisher: ProQuest LLC.

Shahriar et al., "Ultrahigh Precision Absolute and Relative Rotation Sensing using Slow and Fast Light", "Quantum Information Technology http://www.rle.mit.edu/quantummuri/publications/Additions4_05/Shahriar_8.pdf accessed Aug. 5, 2010", 2005, pp. 1-5, Publisher: Northwestern University.

Slagmolen, "Phase-Sensitive Reflection Technique for Characterization of a Fabry-Perot Interferometer", "Applied Optics", Jul. 20, 2000, pp. 3638-3643, vol. 39, No. 21, Publisher: Optical Society of America.

Smith et al., "Dispersion-enhanced laser gyroscope", "Physical Review A", 2008, pp. 053824-1 thru 053824-9, vol. 78, No. 053824, Publisher: The American Physical Society.

Solimeno et al., "Gain Saturation and Output Power of Distributed Feedback Lasers", "Study of Distributed Feedback Lasers", 1976, pp. 1309-1321, vol. 9, No. 8, Published in: Great Britain.

Terrel, "Ring-Coupled Mach-Zehnder Interferometer Optimized for Sensing", "Applied Optics", Sep. 1, 2009, pp. 4874-4879, vol. 48, No. 26, Publisher: Optical Society of America.

Terrel, "Coupled Resonator Gyroscopes: What Works and What Does Not", "Advances in Slow and Fast Light III", Jun. 24, 2010, pp. 19, vol. 7612, Publisher: SPIE.

Fox et al. , "Effects of Gain Saturation on the Oscillating Modes of Optical Masers", "IEEE Journal of Quantum Electronics", Dec. 1966, pp. 774-783, vol. QE-2, No. 12, Publisher: IEEE.

Aronowitz, "Fundamentals of the Ring Laser Gyro", "http://ftp.rta.nato.int/Public/PubFullText/RTO/AG/RTO-AG-339/$AG-339-03.PDF", Apr. 28, 2000, pp. 3-1 thru 3-45, Publisher: NATO Research and Technology Organisation.

Bennett, Jr. , "Hole Burning Effects in a HE-NE Optical Maser", "Physical Review", Apr. 15, 1962, pp. 580-594, vol. 126, No. 2.

Du, "Understanding the Characteristics of Gain Saturation for Homogeneously Broadened Laser Medium From the Point of View of", "http://spie.org/etop/2007/etop07fundamentalsIV.pdf", 2007.

Windholz (Editor), "40th European Group for Atomic Systems Abstracts", Jul. 2-5, 2008, Publisher: European Phsyical Society.

Gamidov et al. , "Influence of Saturation Beam Parameters on Laser Frequency Locked to the Cesium Cycling Transition", "1995 IEEE International Frequency Control Symposium", 1995, pp. 149-152, Publisher: IEEE.

Hobbs, "Ultrasensitive Laser Masurements Without Tears", "Applied Optics", Feb. 1, 1997, pp. 903-920, vol. 36, No. 4, Publisher: Optical Society of America.

Karapetyan, "Advanced Configuration of Gravitational-Wave Interferometer on the Base of 'Sensitive Mode' in 'White-Light Cavity'", "Optics Communications 219 (2003)", pp. 335-340, Publisher: Elsevier Science B.V.

Kohel et al., "Quantum Gravity Gradiometer Development for Space", "http://esto.nasa.gov/conferences/ESTC2006/papers/b4p1.pdf", Jun. 28, 2006, pp. 1-7.

Pati et al., "Demonstration of Displacement-Measurement-Sensitivity Proportional to Inverse Group Index of Intra-Cavity Medium in a Ri", "Optics Communications 281 (2008)", 2008, pp. 4931-4935, Publisher: Elsevier B.V.

Pati et al., "Simultaneous Slow and Fast Light Effects Using Probe Gain and Pump Depletion Via Raman Gain in Atomic Vapor", 2008, Publisher: Optical Society of America.

Pati et al., "Demonstration of a Tunable-Bandwidth White Light Interferometer using Anomalous Dispersion in Atomic Vapor", Sep. 2, 2007, Publisher: Northwestern University.

Phillips, "Spatially-Resolved Temperature Diagnostic for Supersonic Flow Using Cross-Beam Doppler-Limited Laser Saturation Spectros", Mar. 2006, Publisher: Air Force Institute of Technology, Published in: Wright-Patterson Air Force Base, Ohio.

Rinkleff et al., "The Concept of White Light Cavities Using Atomic Phase Coherence", "Physica Scripta", 2005, pp. 85-88, vol. T118, Publisher: Physica Scripta.

Salit et al., "Fast-Light for Astrophysics: Super-Sensitive Gyroscopes and Gravitational Wave Detectors", "Journal of Modern Optics", Nov. 10-20, 2007, pp. 2425-2440, vol. 54, No. 16-17, Publisher: Taylor & Francis.

Shahriar et al. , "Ultrahigh Enhancement in Absolute and Relative Rotation Sensing Using Fast and Slow Light", "Available at http://arxiv.org/ftp/quant-ph/papers/0505/0505192.pdf accessed Aug. 5, 2010", Jul. 17, 2005, Publisher: The American Physical Society.

Shahriar et al., "Ultrahigh Precision Absolute and Relative Rotation Sensing Using Fast and Slow Light", "Quantum Information Technology", Oct. 23, 2002 , Publisher: MIT.

Shahriar et al., "Application of Fast-Light in Gravitational Wave Detection with Interferometers and Resonators", "Journal of Modern Optics", Nov. 10-20, 2008, pp. 3133-3147, vol. 55, No. 19-20, Publisher: Taylor & Francis.

Shahriar et al., "Ultrahigh Precision Absolute and Relative Rotation Sensing using Slow and Fast Light", "Quantum Information Technology http://www.rle.mit.edu/quantummuri/publications/Additions4_05/Shahriar_8.pdf accessed Aug. 5, 2010", 2005, Publisher: Northwestern University.

Smith et al., "Dispersion-enhanced Laser Gyroscope", "available at http://ntrs.nasa.gov/archive/nasa/casi.ntrs.nasa.gov/20090019025_2009016480.pdf accessed Aug. 5, 2010", Jun. 16, 2008, Publisher: NASA.

Smith et al., "Dispersion-ehanced laser gyroscope", "Physical Review A", 2008, pp. 053824-1 thru 053824-9, vol. 78, No. 053824, Publisher: The American Physical Society.

Solimeno et al., "Gain Saturation and Output Power of Distributed Feedback Lasers", "Study of Distributed Feedback Lasers", 1976, pp. 1309-1321, vol. 9, No. 8, Published in: Great Britian.

Tripathi et al., "Experimental Constraints of Using Slow-Light in Sodium Vapor for Light-Drag Enhanced Relative Rotation Sensing", "Optics Communications", Oct. 15, 2006, pp. 604-608, vol. 266, No. 2, Publisher: Elsevier B.V.

"Saturated Absorption Spectroscopy—Experiment SAS", "Advanced Physics Laboratory", Apr. 7, 2010, Publisher: University of Flordia—Department of Physics.

Salit et al., "U.S. Appl. No. 12/755,623: Enhanced Ring Laser Gyroscope With Dispersion Controlled Gain Condition", filed Apr. 7, 2010.

Wicht et al., "White-Light Cavities, Atomic Phase Coherence, and Gravitational Wave Detectors", "Optics Communications", Jan. 15, 1997, pp. 431-439, vol. 134, Publisher: Elsevier Science B.V.

Wise et al., "Linewidth-Broadened Fabry-Perot Cavities within Future Gravitational Wave Detectors", "Classical and Quantum Gravity", 2004, pp. S1031-S1036, vol. 21, Publisher: Institute of Physics Publishing.

Yum et al., "Fast-Light in a Photorefractive Crystal for Gravitational Wave Detection", "Optics Express", Dec. 8, 2008, pp. 20448-20456, vol. 16, No. 25, Publisher: Optical Society of America.

* cited by examiner

INCREASING THE SCALE FACTOR OF GAS LASER BASED GYROSCOPES WITH AN EXTERNAL GAIN SATURATION BEAM

CROSS-REFERENCE TO RELATED APPLICATIONS

The present application is related to commonly assigned and co-pending U.S. patent application Ser. No. 12/173,777 (hereafter "the '777 Application") entitled "AN ENHANCED SCALE FACTOR RING LASER GYROSCOPE", filed on Jul. 15, 2008. The present application is also related to commonly assigned and co-pending U.S. patent application Ser. No. 12/755,623 (hereafter "the '623 Application") entitled "ENHANCED RING LASER GYROSCOPE WITH DISPERSION CONTROLLED GAIN CONDITION", filed on Apr. 7, 2010. The '777 Application and the '623 Application are both incorporated herein by reference in their entirety.

BACKGROUND

Ring laser gyroscopes are navigation instruments used to measure rotation rates about an axis of rotation. A ring laser gyroscope typically includes a closed cavity and at least three mirrors designed to reflect light in a loop. Light travels through the closed cavity in both a clock-wise ("CW") and a counter clock-wise ("CCW") direction. When the ring laser gyroscope is stationary, a beam of light traveling through the cavity in the CW direction has the same frequency as a beam of light traveling through the cavity in the CCW direction.

When the ring laser gyroscope is rotating, the frequency of the CW beam is different than that of the CCW beam. Utilizing the Sagnac effect, the frequency difference between a first beam traveling in the CW direction and a second beam traveling in the CCW direction is calculated. This is called resonant frequency splitting.

The rotation rate of the gyroscope is proportional to the frequency difference between the CW beam and the CCW beam. The constant of proportionality between the resonant frequency splitting and the rotation rate is the scale factor. The scale factor is a scaling constant that determines the amplitude of the difference signal generated at a given rotation rate. The scale factor is normally proportional to the area of the device, so that a tradeoff exists between size and performance. The performance of a ring laser gyroscope depends on its scale factor.

SUMMARY

One embodiment of a ring laser gyroscope discussed herein includes a cavity containing a gain medium, a first plurality of reflective surfaces coupled to the cavity, at least one medium exciter operable to excite the gain medium, and at least one saturation beam source operable to emit a saturation beam. The first plurality of reflective surfaces includes at least a first reflective surface, a second reflective surface, and a third reflective surface. The first, second, and third reflective surfaces are positioned to reflect light along a path defined in the cavity between the plurality of reflective surfaces. The excited gain medium induces first and second laser fields within the cavity. The emitted saturation beam intersects with the first and second laser fields at a first interaction region of the cavity. The saturation beam interacts with the gain medium to reduce the gain of the first and second laser fields at a first range of frequencies.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
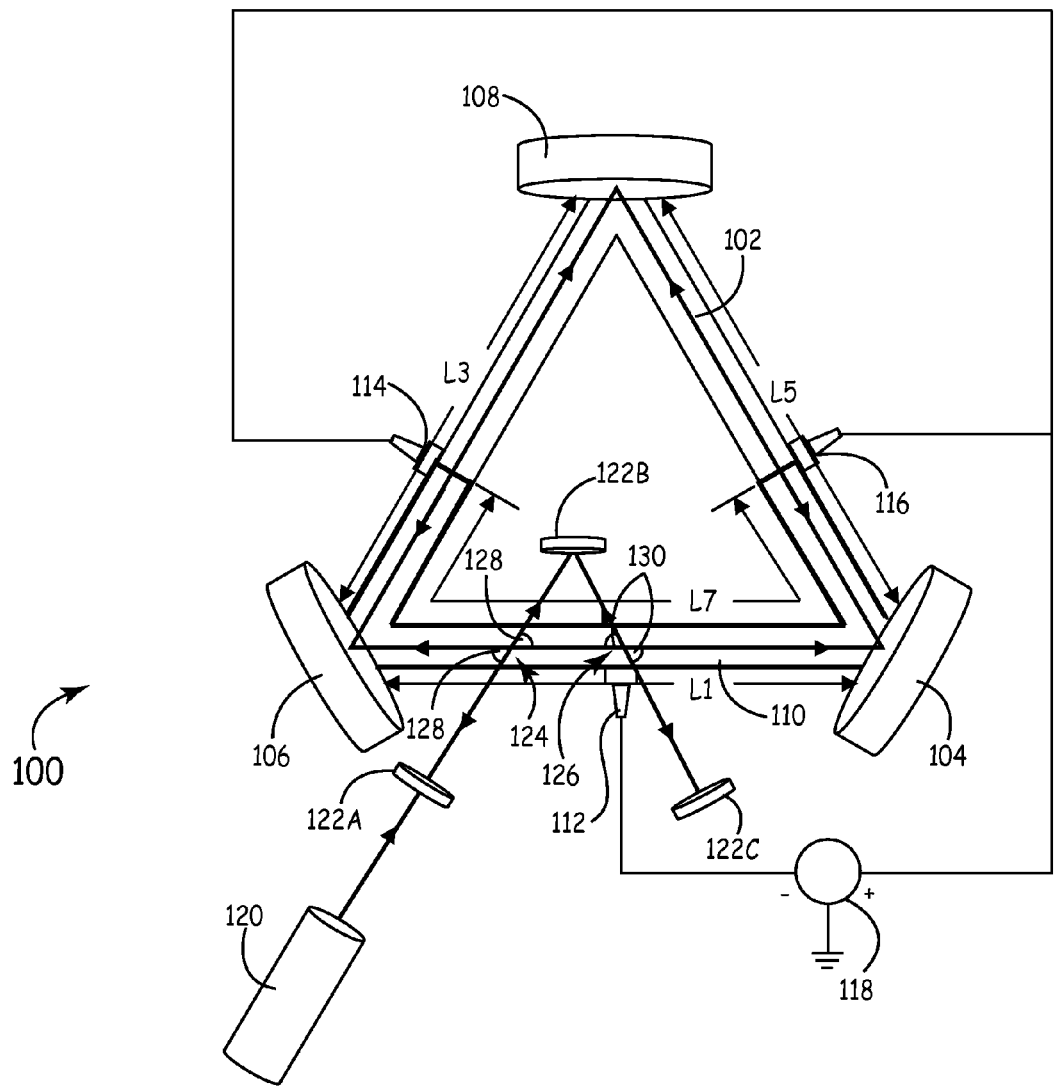
FIG. 1 is a block diagram depicting an exemplary embodiment of a fast light ring laser gyroscope with an enhanced scale factor.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and in the specification is not to be construed as limiting the order in which the individual steps may be performed. The following detailed description is, therefore, not to be taken in a limiting sense.

The ring laser gyroscopes described herein increase the scale factor without increasing the area of the device through fast light dispersion. In example gyroscopes described below, an additional frequency dependent phase shift is introduced within a laser cavity. This phase shift can be introduced by any dispersive element under certain conditions. One of these conditions is that the total round trip optical phase in the cavity varies with optical frequency significantly less than would be the case in free space, with the scale factor enhancement increasing as the derivative of phase with respect to frequency approaches zero. This condition is met by some types of anomalous dispersion. Thus, the fast light laser gyroscopes described herein leverage anomalous dispersion to increase the scale factor. While this specification generally describes using a laser operating in a continuous wave mode, in other example embodiments other modes of operation can be used.

Increasing the scale factor using fast light dispersion allows for miniaturization of navigation grade gyros, enabling a potential cost reduction as well. Increasing the scale factor also reduces the "dead band" in conventional ring laser gyroscopes. This reduction in "dead band" may eliminate the need for a dither motor with associated savings in production costs and reduction in noise. The increase in scale factor without respect to area of the ring laser gyroscope allows the use of ring laser gyroscopes in applications requiring small devices.

FIG. 1 is a block diagram depicting an exemplary fast light ring laser gyroscope 100 having an enhanced scale factor. The gyroscope 100 includes an interior cavity 102 filed with a Helium-Neon ("HeNe") gas. The interior cavity 102 forms an equilateral triangle. A first mirror 104 is positioned at a first corner of the triangle. A second mirror 106 is positioned at a second corner of the triangle. A third mirror 108 is positioned at a third corner of the triangle. The length of the cavity 102 between mirror 104 and mirror 106 is L1. The length of the cavity 102 between mirror 106 and mirror 108 is L3. The length of the cavity 102 between mirror 108 and mirror 104 is L5. In other embodiments, the interior cavity 102 forms other shapes and/or greater or fewer mirrors are used in the gyroscope 100. As used herein, the term mirror is defined to mean any reflective surface capable of directing light through the cavity. For example, suitable mirror include, but are not limited to, Bragg gratings, photonic crystals, dielectric stacks, etc. Alternatively, the cavity path may be internal to a single block of transparent material, with the boundary between the material and the surrounding air serving as the reflective surface. Hence, the terms "mirror" and "reflective surface" are used interchangeably herein.

A portion of HeNe gas in the cavity 102 of length L7 is converted into a gain medium 110 by exciting the Helium and Neon atoms. The gain medium 110 in gyroscope 100 fills all of the cavity 102 between mirror 104 and mirror 106 in addition to portions of the cavity 102 between mirror 106 and mirror 108 and portions of the cavity 102 between mirror 104 and mirror 108. While length L7 spans the entire length L1 and portions of length L3 and L5 in the example embodiment, it can be shorter or longer in other embodiments. The Helium and Neon atoms are excited by inducing a current across the length L7. The current is induced using electrode 112, electrode 114, and electrode 116 powered by a power source 118. The power source 118 applies a current between electrode 112 and electrode 114 and electrode 116. In one non-limiting exemplary embodiment, electrode 112 is a cathode, electrode 114 is an anode, and electrode 116 is an anode. In other embodiments, different amounts of either cathodes, anodes, or both are included. The portion of the HeNe gas is thus excited into the gain medium 110 using a medium exciter including electrode 112, electrode 114, and electrode 116. The excited Helium atoms collide with the Neon atoms which produce fluorescence and stimulated emission.

The gain medium 110 induces light that propagates in both the CW and CCW directions through the cavity 102 of the gyroscope 100. The light propagating through the cavity 102 of the gyroscope 100 constructively interferes with itself to create two counter rotating beams, one traveling in the CW direction and the other traveling in the CCW direction, both with a wavelength of approximately 633 nanometers, in this example, while the gyroscope 100 is stationary. These beams are also sometimes referred to by other names, such as laser fields, light fields, or laser beams. Light from both of the beams is tapped off through one or more of the mirrors and the light from the CW beam is interfered with the CCW beam to determine the frequency difference between the CW and CCW beams. To avoid confusion in the drawings, the structure for tapping and interfering the two laser beams is not shown. The tapping of the laser beams occurs pursuant to established procedures. In other embodiments, different amounts of electrodes or other methods and medium exciters are used to excite the gain medium 110 in the cavity 102. For example, in some embodiments optical pumping is used to excite a crystalline solid gain medium. Components and methods used for optical pumping are known to one having skill in the art.

Gyroscope 100 also includes a saturation beam that interacts with the gain medium 110 at two interaction regions of the cavity 102. As the saturation beam interacts with the gain medium 110, it saturates some of the neon atoms that would normally exhibit gain. Once saturated, these neon atoms no longer exhibit gain. Thus, the gain is decreased at the frequency of the saturation beam, thereby creating a dip (hole) in the gain profile. Once some of the neon atoms are saturated, the gain profile will include two peaks and a trough as described in further detail below. Anomalous dispersion is exhibited in the trough between the two peaks where the index of refraction has a negative slope. This is also described in further detail below.

To facilitate interaction between the saturation beam and the gain medium for the counter propagating laser beams, gyroscope 100 includes a saturation beam generating device 120, a mirror 122A, a mirror 122B, a and mirror 122C. Mirror 122A is positioned on a first side of the cavity 102, mirror 122B is positioned on a second side of the cavity 102, and mirror 122C is positioned on the first side of the cavity 102. In addition, the saturation beam generating device 120 is positioned on the first side of the cavity 102. In this example, the saturation beam generating device 120 generates a saturation beam. In this embodiment, the saturation beam is a laser beam. However, in other embodiments, the saturation beam can be other types of monochromatic light.

The saturation beam is passed through the back side of the partially transparent mirror 122A and through a first interaction region 124 of the cavity 102 where it interacts with the gain medium 110 for a first time. The saturation beam exits to the second side of the cavity 102 and is reflected by the mirror 122B through a second interaction region 126 of the cavity 102 where it interacts with the gain medium 110 for a second time. The saturation beam exits to the first side of the cavity 102 and is reflected by the mirror 122C in a reverse path through the various interaction regions of the cavity 102 reflecting off mirror 122C, mirror 122B, and mirror 122A. The saturation beam repeats its journey through the various interaction regions of the cavity 102 reflecting off mirror 122A, mirror 122B, and mirror 122C in the forward and reverse direction. In example embodiments, the saturation beam constructively interferes with itself between mirror 122A, mirror 122B, and mirror 122C, thereby creating a standing wave in the saturation beam. In other example embodiments, different amounts of mirrors are used. Specifically, some example embodiments do not include mirror 122A and/or mirror 122C. In some of these embodiments, the saturation beam does not build up as much intensity, because it does not constructively interfere with itself.

The angles of incidence of the saturation beam relative to the counter propagating laser beams in gyroscope 100 are oblique angles that are neither parallel with, nor perpendicular to, the paths the counter propagating laser beams travel in the cavity. In gyroscope 100, the saturation beam intersects the counter propagating laser beams at a first angle of incidence 128 in the first interaction region 124 and at a second angle of incidence 130 in the second interaction region 124. In some example embodiments, the first angle of incidence 128 equals the second angle of incidence 130. In other example embodiments, the first angle of incidence 128 is different than the second angle of incidence 130. The impact and selection of the angle of incidence is discussed in detail below. In other embodiments, greater or fewer mirrors are included and the saturation beam interacts with the counter propagating laser beams for various times and at various angles of incidence. In some embodiments, no standing waves are included in the saturation beam. In some embodiments, the saturation beam includes a propagating wave.

The gain medium 110 filling the cavity 102 between mirror 104 and mirror 106 for length L7 (or length L9 in gyroscope 400) has an index of refraction of n(ω). The index of refraction n(ω) is given by the following equation:

$$n(\omega) = 1 + \frac{c}{\pi} \int_0^\infty \frac{\alpha(\omega')}{\omega'^2 - \omega^2} \, d\omega', \quad \text{(eq. 1)}$$

where ω is the frequency, c is the speed of light, and α is the gain. When the slope of the index of refraction n(ω) is negative, the desired phase shift can be induced to increase the scale factor. The slope of the index of refraction n(ω) can be found by taking the derivative of the index of refraction n(ω). Thus, in this embodiment, the gyroscope 100 is configured to operate in a range of frequencies where the slope of the index of refraction n(ω) is negative, as explained in more detail below with respect to FIG. 2 and FIG. 3.

The index of refraction n(ω) of the gain medium 110 is modified through interaction with a saturation beam. By fine tuning the saturation beam, the index of refraction of n(ω) can be tuned to vary in specific ways at various frequencies as described below. While embodiments of the saturation beam described herein have a frequency that matches the gain center frequency of the first and second counter propagating laser beams, other embodiments include saturation beams operating at other frequencies.

Figure 2:
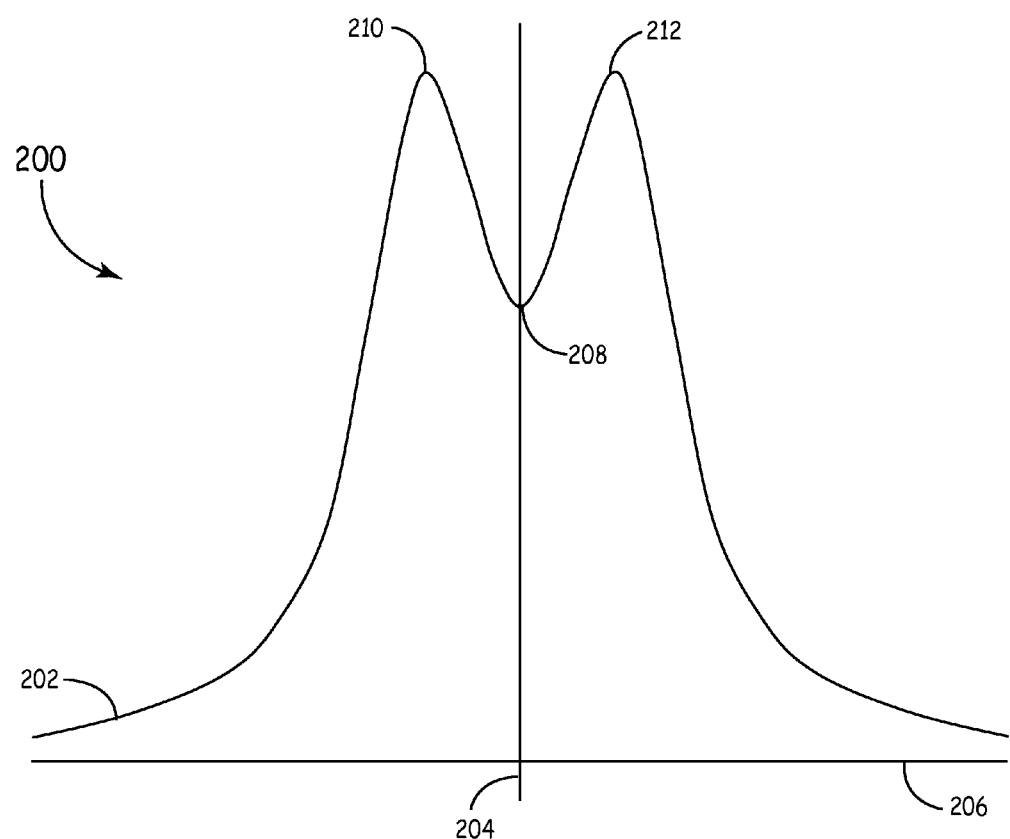
FIG. 2 shows a graph of a gain profile of an example embodiment of a fast light ring laser gyroscope interacting with a saturation beam.

FIG. 2 shows an exemplary graph 200 of the gain profile 202 of the gyroscope 100 during interaction with a saturation beam. The gain profile 202 is plotted on the graph 200 as amplitude (Y axis 204) as a function of frequency (X axis 206). When the gyroscope is not rotating, the gain profile 202 has a gain center frequency 208. The gain center frequency 208 is found in a trough between a first peak at a first frequency 210 and at a second peak at a second frequency 212. The dual peak nature of the gain profile 202 is created by the gain saturation occurring through the interaction of the saturation beam with the first and second counter propagating laser beams. The graph 200 is centered at the gain center frequency 208. Thus, the gain center frequency 208 is on the Y axis 204 and at the center of the gain profile 202. Because greater amplitudes are desirable in gyroscope design, conventional gyroscopes are typically designed to operate at or near the center of the gain profile 202 near the gain center frequency 208.

Because of the dual peaks on each side of the gain center frequency 208, the slope of the index of refraction n(ω) is negative near the center of the gain profile 202 at the gain center frequency 208. As noted above, when the slope of the index of refraction n(ω) is negative, the desired phase shift in the laser light traveling in cavity 102 can be induced to increase the scale factor.

As noted above, the angle of incidence is an oblique angle that is neither parallel with, nor perpendicular to, the paths the counter propagating laser beams travel in the cavity. In some example embodiments, if the angle of incidence is zero degrees, the bandwidth of attenuation is approximately the linewidth of the saturation beam. In this case, the two peaks will be close to one another with a small trough in between. While an embodiment with the angle of incidence at zero degrees will saturate only a small fraction of the gain spectrum, the saturation beam will also generally scatter off of imperfect reflecting surfaces within the gyroscope and undesirably interfere with detection of the frequency of the first and second counter propagating laser beams. The likely increase in measurement noise due to this additional scattering outweighs the benefits in this case.

In contrast, if the angle of incidence is 90 degrees, the bandwidth of the attenuation is very broad, effectively spanning and partially saturating the entire frequency spectrum of the gain profile 202. In this case, there is no unwanted scattering present. Still, because the entire gain profile 202 will be attenuated in such embodiments, the saturated gain profile 202 would not have the two peaks and a trough necessary for the index of refraction to have the negative slope at the gain center frequency 208 required for scale factor enhancement at the gain center frequency 208.

Figure 4:
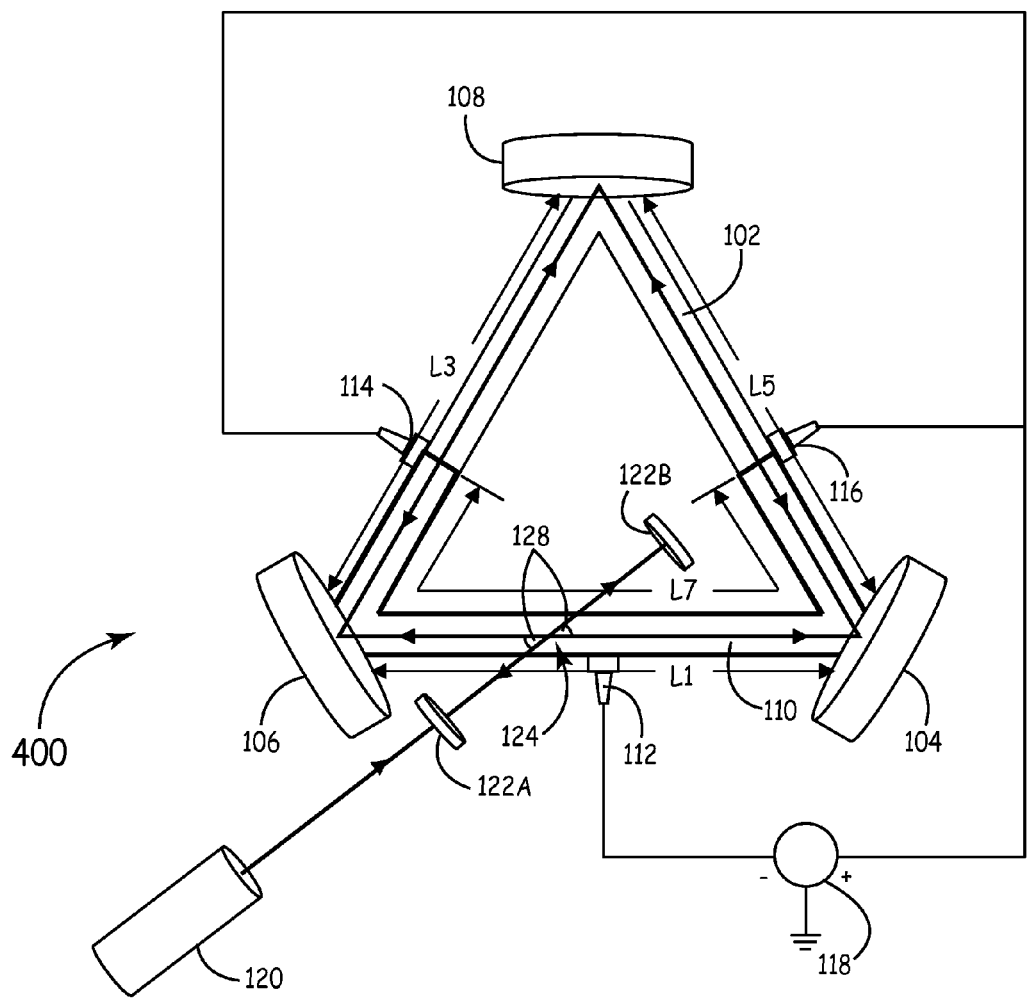
FIG. 4 is a block diagram depicting another exemplary embodiment of a fast light ring laser gyroscope with an enhanced scale factor.
Figure 5:
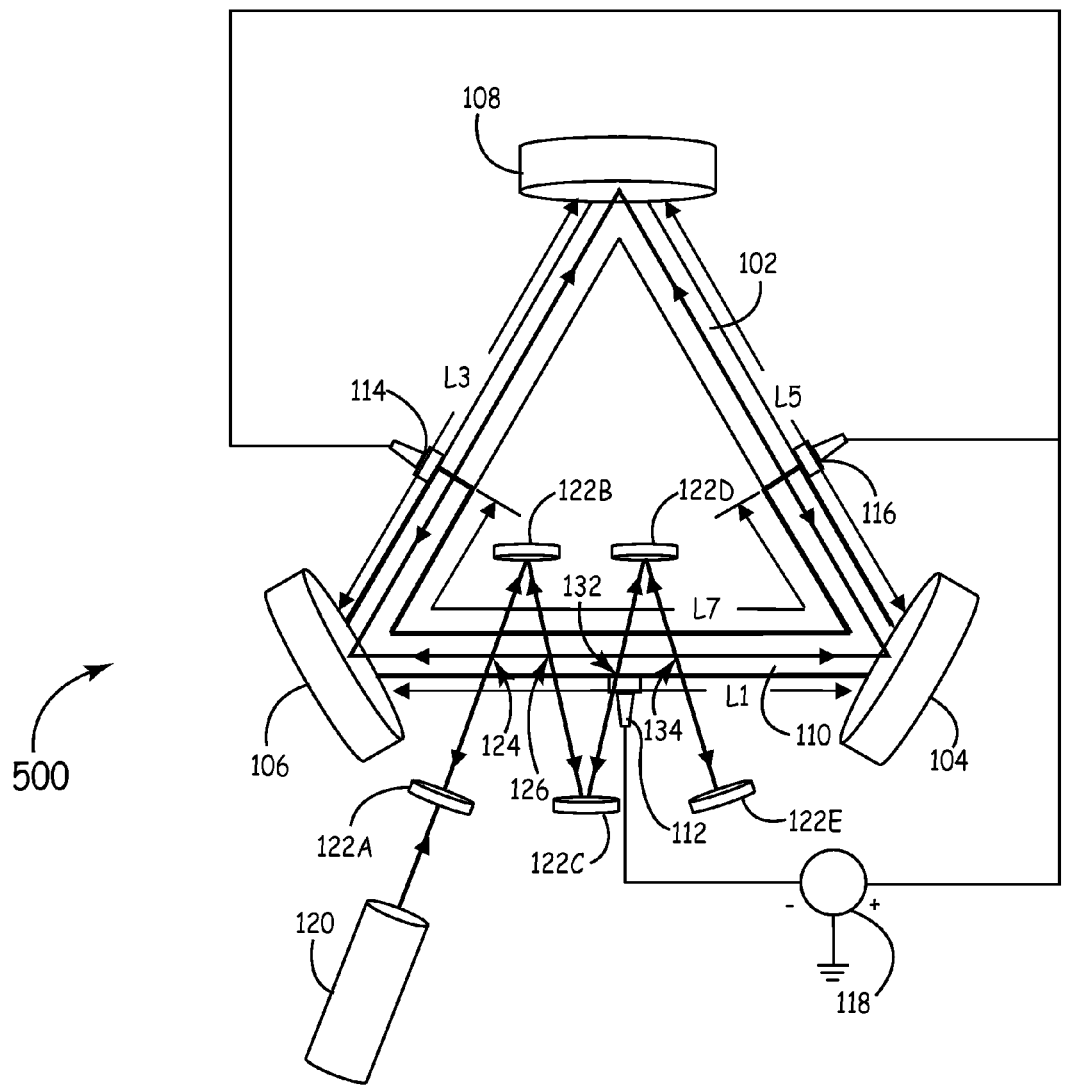
FIG. 5 is a block diagram depicting another exemplary embodiment of a fast light ring laser gyroscope with an enhanced scale factor.

In some implementations, an angle of incidence is chosen somewhere between zero and 90 degrees, exclusive of zero and 90 degrees. In these implementations, the component of the beam which is parallel to the gyro beams will again reduce the gain for the counter propagating laser beams over a bandwidth equal to the linewidth of the saturation beam, while the perpendicular component will reduce the gain of the counter propagating laser beams at all other frequencies. In example embodiments, the angle of incidence is chosen to be large enough that the saturation beam does not scatter onto the detectors for the first and second counter propagating laser beams. In addition, the angle of incidence is chosen to be small enough that the saturation beam still effectively reduces the gain in a small region of the gain profile 202. In addition, the angle of incidence can be chosen to have the additional advantage of increasing the length of the interaction region between the saturation beam and the atoms which provide gain for the first and second counter propagating laser beams. The increased length of the interaction region contributes to a larger proportion of the relevant atoms being saturated. Due to drawing space constraints, the angles of incidence shown in FIG. 1, FIG. 4, and FIG. 5 are provided for purposes of explanation and not by way of limitation. Indeed, the angle of incidence in some embodiments is smaller than that shown in the Figures. For example, the angle of incidence in some embodiments may be less than 30, 20, or even 10 degrees.

In some embodiments, such as gyroscope 100 and gyroscope 500, the saturation beam is interacted with the gain medium 110 at multiple interaction regions, thereby allowing a larger proportion of the relevant atoms to be saturated. In some embodiments, such as gyroscope 100 and gyroscope 500, the saturation beam resonates in its own cavity to build up intensity. The higher intensity saturation beam generally saturates a larger proportion of the relevant atoms than a lower intensity saturation beam. These and similar principles can be applied to create gyroscopes having any number of interaction regions and any number of different angles of incidence. Embodiments having additional numbers of interaction regions are described below.

Figure 3:
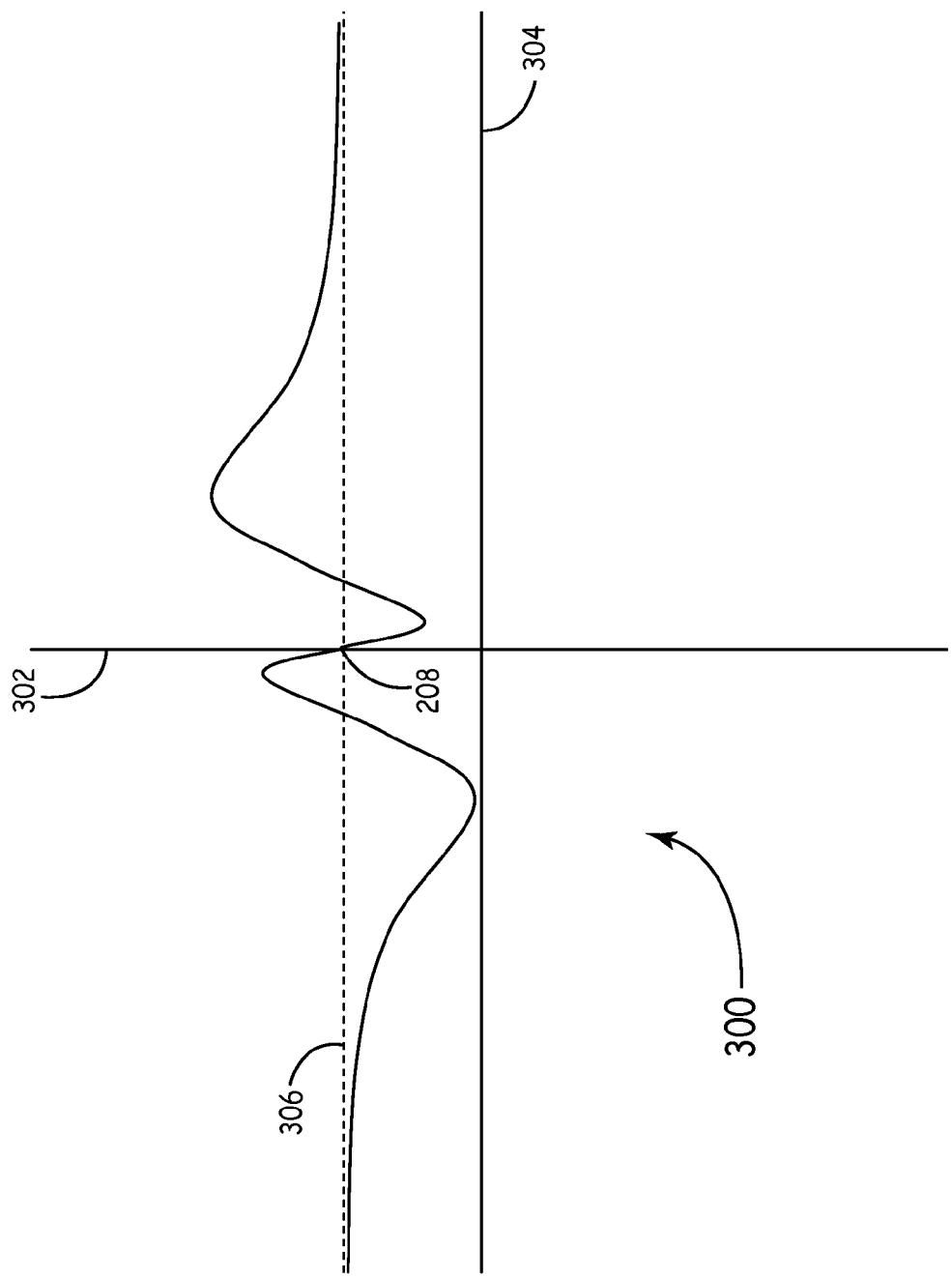
FIG. 3 shows a graph of an index of refraction of an example embodiment of a fast light ring laser gyroscope interacting with a saturation beam.

FIG. 3 shows an exemplary graph 300 of the index of refraction of the gain medium 110 of the gyroscope 100. The graph 300 plots the amplitude of the index of refraction (Y axis 302) as a function of frequency (X axis 304). The graph 300 is also centered horizontally at the gain center frequency 208, so that the gain center frequency 208 is on the Y axis. The graph 300 is further centered vertically around line 306 at y=1. The index of refraction has a negative slope at and surrounding the gain center frequency 208. Thus, the example gyroscope 100 operates at or near the gain center frequency 208, where the slope of the index of refraction n(ω) is negative. It should also be noted that there are a range of available frequencies on both sides of the Y axis 302 where the index of refraction n(ω) has a negative slope.

Because the gyroscope 100 operates at or near the gain center frequency 208, where the gain medium 110 has a negative slope of index of refraction n(ω), the dispersion caused by the gain medium 110 is anomalous dispersion. Anomalous dispersion is present when the index of refraction increases with increasing wavelength. If the slope of the index of refraction n(ω) was positive, the dispersion would be normal dispersion. Normal dispersion occurs when the index of refraction decreases with increasing wavelength. Because the gain medium 110 causes anomalous dispersion at and near the gain center frequency 208, it enables the total round trip optical phase in the cavity to vary less as a function of optical frequency than it would in free space to the first order. In some example embodiments, the total round trip optical phase in the cavity does not vary at all with optical frequency to the first order. As a result of the rotation, the effective length of the cavity changes so that the resonant frequency in the stationary cavity no longer experiences a phase shift of two pi. In addition, neighboring frequencies also experience non-resonant round trip phase.

Since the phase varies more slowly with frequency than in free space, the resonant frequencies will differ from the gain center frequency by a greater amount. The factor by which the frequency shifts with rotation rate is thus enhanced. This factor is known as the scale factor because it is generally proportional to the size of the device. The length L7 of the gain medium 110 along with the frequency and angle of incidence of the saturation beam are adjusted to achieve the desired scale factor.

The index of refraction n(ω) is associated with the phase profile according to the following equation:

$$\phi_{round-trip} = \frac{2\pi}{\lambda}(nl_1 + L_{gyro} - l_1), \quad \text{(eq. 2)}$$

where $\phi_{round-trip}$ is the phase shift due to a single pass through the saturated gain medium 110, λ is the free space wavelength of the light, n is the index of refraction of the saturated gain medium 110, $l_1$ is the length light travels through the saturated gain medium 110 during one loop through the cavity 102 of the gyroscope 100 while stationary, and $L_{gyro}$ is the total length light travels during one loop through the cavity 102 of the gyroscope 100 while stationary.

The expression for the index of refraction n(ω) of the gain medium 110 given in equation 1 can be used to determine a desired gain center frequency 208 and the associated gain profile 202 that exhibits the necessary scale factor enhancement. Equation 3 below indicates the conditions on index of refraction for which scale factor is enhanced, but neither the degree of enhancement nor the dynamic range over which the enhancement operates is constant. Enhancement of the scale factor generally occurs for index slopes between zero and the negative value given by the right side of equation 3. The degree of enhancement is zero for a slope of zero. The degree of enhancement increases as the slope of the index approaches the value given by the right side of equation 3. The scale factor enhancement and the dynamic range over which the enhancement operates are inversely related. As the scale factor enhancement approaches infinity, the dynamic range approaches zero. The scale factor enhancement approaches infinity when the index slope approaches the negative value given by solving for the right side of equation 3.

Equation 3 is:

$$0 \geq \frac{dn_1}{d\omega}\bigg|_{\omega_0} \geq -\frac{L_{gyro}}{l_1 \omega_0}, \quad \text{(eq. 3)}$$

where ω is the frequency, $n_1$ is the index of refraction of the saturated gain medium 110, $\omega_o$ is the gain center frequency 208, $l_1$ is the length light travels through the partially saturated gain medium 110 during one loop through the cavity 102 of the gyroscope 100 while stationary, and $L_{gyro}$ is the total length light travels during one loop through the cavity 102 of the gyroscope 100 while stationary.

FIG. 4 is a block diagram depicting another exemplary fast light ring laser gyroscope 400 having an enhanced scale factor. As with gyroscope 100, the gyroscope 400 includes the interior cavity 102 filed with a HeNe gas, the first mirror 104, the second mirror 106, the third mirror 108, the gain medium 110, the electrode 112, the electrode 114, the electrode 116, and the power source 118. The gain medium 110 in gyroscope 400 fills all of the cavity 102 between mirror 104 and mirror 106 in addition to portions of the cavity 102 between mirror 106 and mirror 108 and portions of the cavity 102 between mirror 104 and mirror 108. While length L7 spans the entire length L1 and portions of length L3 and L5 in the example embodiment, it can be shorter or longer in other embodiments. Electrode 112, electrode 114, and electrode 116 are positioned so that the current induced spans the desired length of the cavity. The total length of the gain medium 110 in gyroscope 400 is L7. In other embodiments, smaller or larger portions of HeNe gas in the cavity 102 are converted into a gain medium 110 by inducing a current across other lengths. While the description above focuses on gyroscope 400, it applies to various lengths of gain medium 110 filling various portions of the interior cavity 102.

Gyroscope 400 differs from gyroscope 100 in that the saturation beam only interacts with the gain medium 110 at one interaction region of the cavity 102 and that there are only two mirrors used to reflect the saturation beam: mirror 122A and mirror 122B. Mirror 122A is positioned on a first side of the cavity 102 and mirror 122B is positioned on a second side of the cavity 102. In addition, a saturation beam generating device 120 is positioned on the first side of the cavity 102. The saturation beam generating device 120 generates a saturation beam which is passed through the back side of the partially transparent mirror 122A and through a first interaction region 124 of the cavity 102 where it interacts with the gain medium 110 for a first time. The saturation beam exits to the second side of the cavity 102 and is reflected by the mirror 122B back through the first interaction region 124 of the cavity 102 where it interacts with the gain medium 110 for a second time. The saturation beam exits to the first side of the cavity 102 and is reflected by the mirror 122A back through the first interaction region 124 of cavity 102 and continually repeats its journey through the interaction region 124 of the cavity 102 reflecting off mirror 122A and mirror 122B. In example embodiments, the saturation beam constructively interferes with itself between mirror 122A and mirror 122B, thereby creating a standing wave in the saturation beam. In other example embodiments, different amounts of mirrors are used. Specifically, some example embodiments do not include mirror 122A and/or mirror 122C. In some of these embodiments, the saturation beam does not build up as much intensity, because it does not constructively interfere with itself.

The first angle of incidence 128 of the saturation beam relative to the counter propagating laser beams in gyroscope 400 is smaller than the first angle of incidence 128 in gyroscope 100. Still, the first angle of incidence 128 of the saturation beam relative to the counter propagating laser beams in gyroscope 400 is an oblique angle that is neither parallel with, nor perpendicular to, the paths the counter propagating laser beams travel in the cavity. In other embodiments, greater or fewer mirrors are included and the saturation beam interacts with the gain medium 110 for various times and at various angles of incidence. In some embodiments, no standing waves are included in the saturation beam. In some embodiments, the saturation beam includes a propagating wave.

FIG. 5 is a block diagram depicting another exemplary fast light ring laser gyroscope 500 having an enhanced scale factor. As with gyroscope 100 and gyroscope 400, the gyroscope 500 includes the interior cavity 102 filed with a HeNe gas, the first mirror 104, the second mirror 106, the third mirror 108, the gain medium 110, the electrode 112, the electrode 114, the electrode 116, and the power source 118. The gain medium 110 in gyroscope 500 fills all of the cavity 102 between mirror 104 and mirror 106 in addition to portions of the cavity 102 between mirror 106 and mirror 108 and portions of the cavity 102 between mirror 104 and mirror 108. While length L7 spans the entire length L1 and portions of length L3 and L5 in the example embodiment, it can be shorter or longer in other embodiments. Electrode 112, electrode 114, and electrode 116 are positioned so that the current induced spans the desired length of the cavity. The total length of the gain medium 110 in gyroscope 400 is L7. In other embodiments, smaller or larger portions of HeNe gas in the cavity 102 are converted into a gain medium 110 by inducing a current across other lengths. While the description above focuses on gyroscope 500, it applies to various lengths of gain medium 110 filling various portions of the interior cavity 102.

Gyroscope 500 differs from gyroscope 100 and gyroscope 400 in that the saturation beam interacts with the gain medium 110 at four portions of the cavity 102 and that there are five mirrors used to reflect the saturation beam: a mirror 122A, a mirror 122B, a mirror 122C, a mirror 122D, and a mirror 122E. Mirror 122A is positioned on a first side of the cavity 102 and mirror 122B is positioned on a second side of the cavity 102. In addition, a saturation beam generating device 120 is positioned on the first side of the cavity 102. The saturation beam generating device 120 generates a saturation beam which is passed through the back side of the partially transparent mirror 122A and through a first interaction region 124 of the cavity 102 where it interacts with the gain medium 110 for a first time. The saturation beam exits to the second side of the cavity 102 and is reflected by the mirror 122B through a second interaction region 126 of the cavity 102 where it interacts with the gain medium 110 for a second time. The saturation beam exits to the first side of the cavity 102 and is reflected by the mirror 122C through a third interaction region 132 of the cavity 102 where it interacts with the gain medium 110 for a third time. The saturation beam exits to the second side of the cavity 102 and is reflected by the mirror 122D through a fourth interaction region 134 of the cavity 102 where it interacts with the gain medium 110 for a fourth time. The saturation beam exits to the first side of the cavity 102 and is reflected by the mirror 122E in a reverse path through the various interaction regions of the cavity 102 reflecting off mirrors 122D, 122C, and 122B until it is reflected by mirror 122A and it repeats the forward journey. The saturation beam repeats its journey through the various interaction regions of the cavity 102 reflecting off mirror 122A, mirror 122B, mirror 122C, mirror 122D, and mirror 122E in the forward and reverse direction. In example embodiments, the saturation beam constructively interferes with itself between mirror 122A, mirror 122B, mirror 122C, mirror 122D, and mirror 122E, thereby creating a standing wave in the saturation beam. In other example embodiments, different amounts of mirrors are used. Specifically, some example embodiments do not include mirror 122A and/or mirror 122E. In some of these embodiments, the saturation beam does not build up as much intensity, because it does not constructively interfere with itself.

The angles of incidence of the saturation beam relative to the counter propagating laser beams in gyroscope 500 are greater than the angle of incidence in either gyroscope 100 or gyroscope 400. While the particular angles are not identified at the various interaction regions in FIG. 5, in some example embodiments these angles are identical, while in other example embodiments the angles at each interaction region are all different. In still other example embodiments, some of the angles are different and others are the same. Still, each angle of incidence of the saturation beam relative to the counter propagating laser beams in gyroscope 400 is an oblique angle that is neither parallel with, nor perpendicular to, the paths the counter propagating laser beams travel in the cavity. In other embodiments, greater or fewer mirrors are included and the saturation beam interacts with the gain medium 110 for various times and at various angles of incidence. In some embodiments, no standing waves are included in the saturation beam. In some embodiments, the saturation beam includes a propagating wave.

Figure 6:
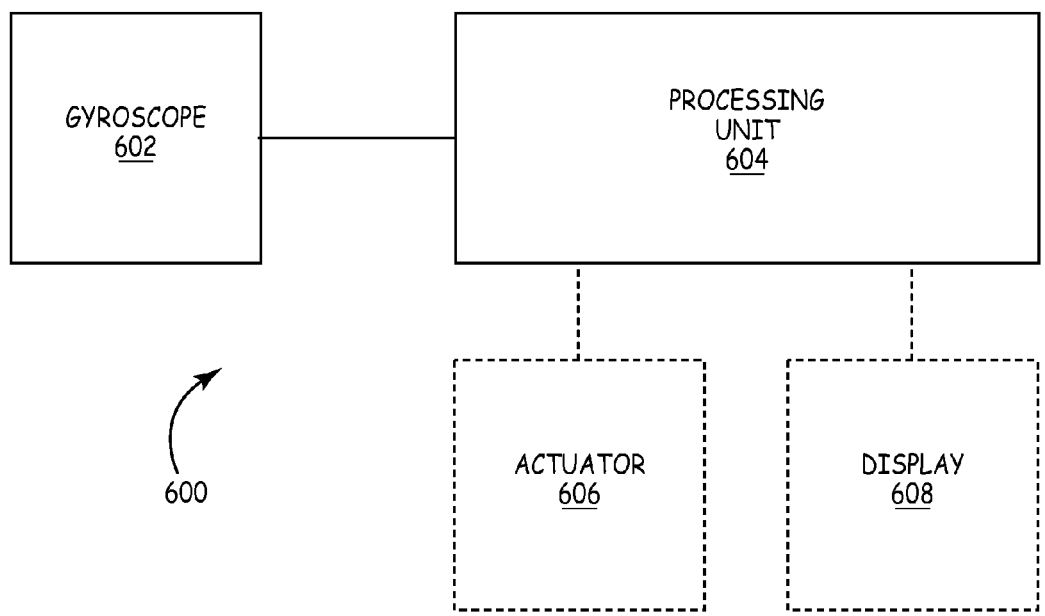
FIG. 6 is a block diagram depicting an exemplary system including a fast light ring laser gyroscope having an enhanced scale factor.

FIG. 6 is a block diagram depicting an exemplary system 600 including a fast light ring laser gyroscope having an enhanced scale factor. The system 600 includes a gyroscope 602, such as exemplary fast light ring laser gyroscope 100 described above. In addition to the gyroscope 602, the system 600 also includes a processing unit 604. The gyroscope 100 is communicatively coupled to the processing unit 604. The processing unit 604 includes a processor and memory. The processing unit 604 includes or functions with software programs, firmware or other computer readable instructions for carrying out various methods, process tasks, calculations, and control functions, used in the processing of signals from the gyroscope 602. For example, in some embodiments, system 600 is a navigation system. In such embodiments, the processing unit 604 calculates navigation parameters based on the signals from the gyroscope 602.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Some embodiments of the system 600 also include at least one actuator 606 and/or at least one display 608. The actuator 606 is actuated by the processing unit 604 based on information received from the gyroscope 602. For example, in some embodiments, the processing unit 604 provides control signals, based on calculated navigation parameters, to the actuator 606 to engage a flap, aileron, elevator, or other control surface on an aircraft. It is to be understood that the implementation of actuator 606 is dependent on the implementation of system 600. The display 608 outputs information received from, or related to, the gyroscope 602. For example, the display 608 could display the rotational rate of an aircraft, vehicle, or other object.

Figure 7:
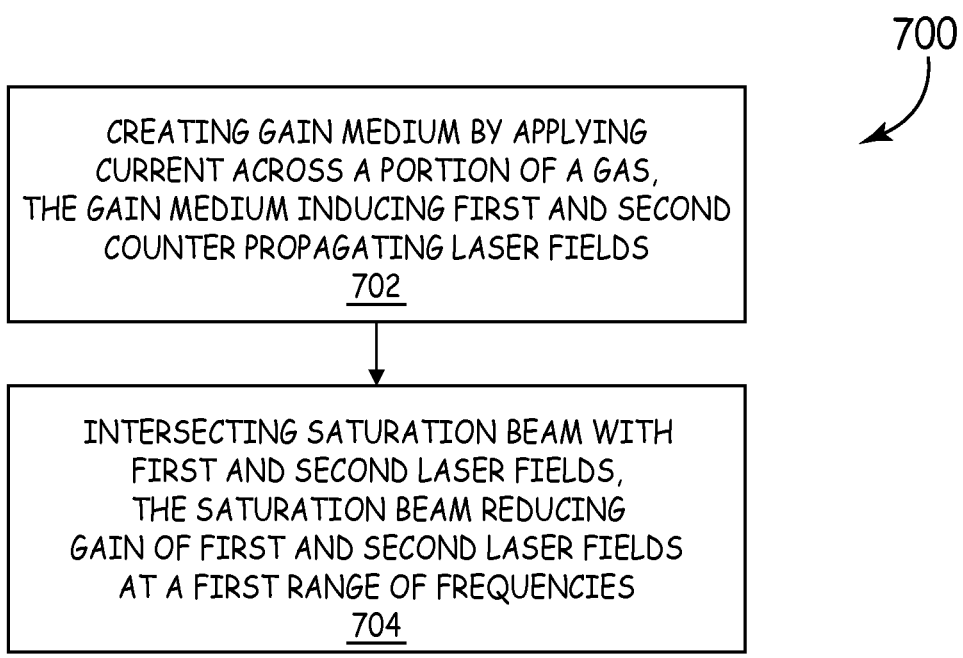
FIG. 7 is a flow chart depicting one embodiment of a method of making a fast light gyroscope.

FIG. 7 is a flow chart depicting one embodiment of a method 700 of increasing a scale factor of a fast light gyroscope. At block 702, a current is applied across a portion of a gas in a gyroscope cavity, exciting the portion of the gas and inducing first and second counter propagating laser fields in the gyroscope cavity. At block 704, a saturation beam is intersected with the first and second laser fields, wherein the saturation beam interacts with the gain medium 110 to reduce the gain experienced by the first and second laser fields at a first range of frequencies. The first range of frequencies is centered at or near the center of the gain profile creating a trough between two peaks. The gyroscope is configured to operate at or near a gain center frequency near the center of the trough, where the index of refraction associated with the gain medium has a negative slope. Because the index of refraction associated with the gain medium has a negative slope at or near the gain center frequency, the gain medium causes anomalous dispersion of light passing through the gain medium. The anomalous dispersion of the light passing through the gain medium results in an increased scale factor for the gyroscope as described above.

Although specific embodiments have been illustrated and described herein, it will be appreciated by those of ordinary skill in the art that any arrangement, which is calculated to achieve the same purpose, may be substituted for the specific embodiments shown. For example, although the exemplary embodiments described above operate using HeNe lasers, it is to be understood that other types of lasers could also be used. In addition, although the exemplary embodiments described above include ring laser gyroscopes having cavities shaped like equilateral triangles with mirrors placed at each of the three corners of the triangle, it is to be understood that the cavities could also be other shapes and greater or fewer mirrors could be used. Therefore, it is manifestly intended that this invention be limited only by the claims and the equivalents thereof.

What is claimed is:

1. A ring laser gyroscope comprising:
a cavity containing a gain medium;
a first plurality of reflective surfaces coupled to the cavity, the first plurality of reflective surfaces including at least a first reflective surface, a second reflective surface, and a third reflective surface, wherein the first reflective surface, the second reflective surface, and the third reflective surface of the plurality of reflective surfaces are positioned to reflect light along a path defined in the cavity between the plurality of reflective surfaces;
at least one medium exciter operable to excite the gain medium, wherein the excited gain medium induces first and second laser fields within the cavity;
a saturation beam source, the saturation beam source emitting a saturation beam that intersects the first and second laser fields at a first interaction region of the cavity, wherein the saturation beam interacts with the gain medium to reduce the gain of the first and second laser fields at a first range of frequencies;
wherein a bandwidth of the first range of frequencies is related to an angle of incidence between the saturation beam and the first and second laser fields; and
wherein the saturation beam intersects the first and second laser fields at an angle of incidence that is oblique.

2. The ring laser gyroscope of claim 1, wherein the cavity includes a first section between the first and second mirrors, a second section between the second and third mirrors, and a third section between the first and third mirrors; and
wherein the gain medium fills the entire first section and portions of the first and third sections.

3. The ring laser gyroscope of claim 1, wherein the medium exciter includes at least a first electrode, a second electrode, and a power source.

4. The ring laser gyroscope of claim 1, wherein a gain profile for the gain medium includes a trough positioned between two peaks, wherein the gyroscope operates at a gain center frequency found in the trough between the two peaks.

5. The ring laser gyroscope of claim 1, wherein the saturation beam operates at the gain center frequency.

6. The ring laser gyroscope of claim 1, further comprising:
a fourth reflective surface positioned on a first side of the cavity, wherein the fourth reflective surface has a partially transparent back side;
a fifth reflective surface positioned on a second side of the cavity opposite the first side of the cavity; and
wherein the saturation beam emitted from the saturation beam source is received at the partially transparent back side of the fourth reflective surface, transmitted from the fourth reflective surface through a first interaction region of the cavity, and reflected by the fifth reflective surface, where the saturation beam interacts with the gain medium in the first interaction region of the cavity.

7. The ring laser gyroscope of claim 6, wherein a bandwidth of the first range of frequencies is related to a first angle of incidence between the saturation beam and the first and second laser fields at the first interaction region and a second angle of incidence between the saturation beam and the first and second laser fields at the second interaction region; and
wherein the first angle of incidence and the second angle of incidence are both oblique angles.

8. The ring laser gyroscope of claim 7, wherein the first angle of incidence is different from the second angle of incidence.

9. The ring laser gyroscope of claim 6, wherein the fifth reflective surface reflects the saturation beam back through the first interaction region of the cavity and back to the fourth reflective surface, wherein the saturation beam interacts with the gain medium in the first interaction region of the cavity.

10. A system comprising:
a processing unit;
a ring laser gyroscope coupled to the processing unit, the ring laser gyroscope including:
a cavity containing a gain medium;
a first plurality of reflective surfaces coupled to the cavity, the first plurality of reflective surfaces including at least a first reflective surface, a second reflective surface, and a third reflective surface, wherein the first reflective surface, the second reflective surface, and the third reflective surface of the plurality of reflective surfaces are positioned to reflect light along a path defined in the cavity between the plurality of reflective surfaces;
at least one medium exciter operable to excite the gain medium, wherein the excited gain medium induces first and second laser fields within the cavity, wherein both the first laser field and the second laser field operate at a gain center frequency when the gyroscope is stationary; and a saturation beam source, the saturation beam source emitting a saturation beam that intersects the first and second laser fields at a first interaction region of the cavity, wherein the saturation beam interacts with the gain medium to reduce the gain of the first and second laser fields at a first range of frequencies; and wherein the processing unit is operable to process signals output from the ring laser gyroscope to calculate at least one navigation parameter.

11. The system of claim 10, wherein a bandwidth of the first range of frequencies is related to an angle of incidence between the saturation beam and the first and second laser fields; and wherein the saturation beam intersects the first and second laser fields at an angle of incidence that is oblique.

12. The system of claim 10, wherein the saturation beam operates at the gain center frequency.

13. A ring laser gyroscope comprising:

a cavity containing a gain medium;

a first plurality of reflective surfaces coupled to the cavity, the first plurality of reflective surfaces including at least a first reflective surface, a second reflective surface, and a third reflective surface, wherein the first reflective surface, the second reflective surface, and the third reflective surface of the plurality of reflective surfaces are positioned to reflect light along a path defined in the cavity between the plurality of reflective surfaces;

at least one medium exciter operable to excite the gain medium, wherein the excited gain medium induces first and second laser fields within the cavity;

a saturation beam source, the saturation beam source emitting a saturation beam that intersects the first and second laser fields at a first interaction region of the cavity, wherein the saturation beam interacts with the gain medium to reduce the gain of the first and second laser fields at a first range of frequencies;

a fourth reflective surface positioned on a first side of the cavity, wherein the fourth reflective surface has a partially transparent back side;

a fifth reflective surface positioned on a second side of the cavity opposite the first side of the cavity; and wherein the saturation beam emitted from the saturation beam source is received at the partially transparent back side of the fourth reflective surface, transmitted from the fourth reflective surface through a first interaction region of the cavity, and reflected by the fifth reflective surface, where the saturation beam interacts with the gain medium in the first interaction region of the cavity.

14. The ring laser gyroscope of claim 13, wherein a bandwidth of the first range of frequencies is related to a first angle of incidence between the saturation beam and the first and second laser fields at the first interaction region and a second angle of incidence between the saturation beam and the first and second laser fields at the second interaction region; and wherein the first angle of incidence and the second angle of incidence are both oblique angles.

15. The ring laser gyroscope of claim 14, wherein the first angle of incidence is different from the second angle of incidence.

16. The ring laser gyroscope of claim 13, wherein the fifth reflective surface reflects the saturation beam back through the first interaction region of the cavity and back to the fourth reflective surface, wherein the saturation beam interacts with the gain medium in the first interaction region of the cavity.

17. The ring laser gyroscope of claim 16, wherein a standing wave is created by the saturation beam between the fourth reflective surface and the fifth reflective surface.

18. The ring laser gyroscope of claim 13, further comprising:

a sixth reflective surface positioned on the first side of the cavity; and wherein the fifth reflective surface reflects the saturation beam through a second interaction region of the cavity to the sixth reflective surface, wherein the saturation beam interacts with the gain medium in the second interaction region of the cavity.

19. The ring laser gyroscope of claim 18, wherein the sixth reflective surface reflects the saturation beam through the second interaction region of the cavity to the fifth reflective surface, wherein the saturation beam interacts with the gain medium in the second interaction region of the cavity; and wherein the fifth reflective surface reflects the saturation beam through the first interaction region of the cavity to the fourth reflective surface, wherein the saturation beam interacts with the gain medium in the first interaction region of the cavity.

20. The ring laser gyroscope of claim 18, further comprising:

a seventh reflective surface positioned on the second side of the cavity;

an eighth reflective surface positioned on the first side of the cavity;

wherein the sixth reflective surface reflects the saturation beam through a third interaction region of the cavity to the seventh reflective surface, wherein the saturation beam interacts with the first and second laser fields in the third interaction region of the cavity; and wherein the seventh reflective surface reflects the saturation beam through a fourth interaction region of the cavity to the eight reflective surface, wherein the saturation beam interacts with the gain medium in the fourth interaction region of the cavity.

* * * * *